US011955003B1

(12) United States Patent
Ikeler

(10) Patent No.: US 11,955,003 B1
(45) Date of Patent: Apr. 9, 2024

(54) ENHANCED TRANSPORTATION CONTROL

(71) Applicant: Thomas J. Ikeler, Washington, DC (US)

(72) Inventor: Thomas J. Ikeler, Washington, DC (US)

( * ) Notice: Subject to any disclaimer, the term of this patent is extended or adjusted under 35 U.S.C. 154(b) by 324 days.

(21) Appl. No.: 17/587,055

(22) Filed: Jan. 28, 2022

Related U.S. Application Data

(60) Provisional application No. 63/144,253, filed on Feb. 1, 2021.

(51) Int. Cl.
*G08G 1/07* (2006.01)
*G08G 1/01* (2006.01)

(52) U.S. Cl.
CPC ............. *G08G 1/07* (2013.01); *G08G 1/0145* (2013.01)

(58) Field of Classification Search
CPC ............................... G08G 1/07; G08G 1/0145
See application file for complete search history.

(56) References Cited

U.S. PATENT DOCUMENTS

| | | | | |
|---|---|---|---|---|
| 5,724,243 | A | 3/1998 | Westerlage et al. | |
| 5,774,827 | A | 6/1998 | Smith, Jr. et al. | |
| 5,892,463 | A | 4/1999 | Hikita et al. | |
| 5,928,307 | A | 7/1999 | Oshizawa et al. | |
| 6,101,443 | A | 8/2000 | Kato et al. | |
| 6,111,521 | A | 8/2000 | Mulder et al. | |
| 6,178,378 | B1 | 1/2001 | Leibold | |
| 6,178,379 | B1 | 1/2001 | Dwyer | |
| 6,629,035 | B2 | 9/2003 | Seto et al. | |
| 7,035,734 | B2 | 4/2006 | Shaffer et al. | |
| 7,711,474 | B2 | 5/2010 | Mueller et al. | |
| 8,660,781 | B2 * | 2/2014 | Cobbold | G06Q 10/10 701/410 |
| 10,359,783 | B2 * | 7/2019 | Williams | G01C 21/005 |
| 11,092,450 | B2 * | 8/2021 | Oltramari | G01C 21/3697 |
| 11,169,538 | B2 * | 11/2021 | Williams | G01C 21/3815 |
| 11,562,300 | B2 * | 1/2023 | Tulabandhula | G01C 21/3423 |
| 11,592,836 | B2 * | 2/2023 | Williams | G05D 1/0088 |
| 11,644,849 | B2 * | 5/2023 | Williams | G01C 21/3664 701/24 |
| 2013/0179065 | A1 * | 7/2013 | Cobbold | G01C 21/3691 701/410 |
| 2017/0357914 | A1 * | 12/2017 | Tulabandhula | H04W 4/025 |
| 2018/0259976 | A1 * | 9/2018 | Williams | G05D 1/0027 |

(Continued)

*Primary Examiner* — Sisay Yacob
(74) *Attorney, Agent, or Firm* — Fish & Richardson P.C.

(57) ABSTRACT

Methods, systems, and apparatus, including computer programs encoded on a computer storage medium, in which a commuter demand control system (CDCS) can obtain commuter profiles, and each profile can identify a commuter, an origin, a destination and commute preferences. The CDCS can determine from the commuter profiles batches of commuter profiles. The CDCS can determine, for a batch of commuter profiles, commute profiles, and each commute profile can correspond to a commuter profile in the batch of commuter profiles. The CDCS can provide the commute profiles. In addition, a traffic control system can obtain a commute profile for at least one commuter, and the commute profile can identify a commuter and an authorized time range. In response to determining that the commuter is authorized to traverse the traffic control device at the time point, the traffic control system can actuate the traffic control device.

16 Claims, 4 Drawing Sheets

(56) References Cited

U.S. PATENT DOCUMENTS

| | | | | |
|---|---|---|---|---|
| 2019/0339712 | A1* | 11/2019 | Williams | G05D 1/0088 |
| 2020/0209000 | A1* | 7/2020 | Oltramari | G01C 21/3697 |
| 2021/0010816 | A1* | 1/2021 | Schmelzer | G06Q 50/40 |
| 2022/0026924 | A1* | 1/2022 | Williams | G06Q 50/40 |
| 2022/0253074 | A1* | 8/2022 | Williams | G05D 1/0088 |
| 2022/0366326 | A1* | 11/2022 | Cope | G06Q 40/08 |

* cited by examiner

ENHANCED TRANSPORTATION CONTROL

CROSS REFERENCE TO RELATED APPLICATION

This application claims the benefit of U.S. Provisional Pat. App. No. 63/144,253, filed on Feb. 1, 2021, which is incorporated by reference.

FIELD

This specification describes enhanced techniques for transportation control and, in one example implementation, describes a system that uses linear programming applied to sets of aggregated data to reduce the computing resources necessary to control transportation apparatuses.

BACKGROUND

Current devices, applications and related technologies and approaches used by commuters, employers and governmental transportation authorities to mitigate traffic congestion have been attempted for many years, with little to no material effect on traffic congestion. For example, the most common supply side (i.e., roadway capacity) responses to traffic congestion used by transportation authorities have been to build more lanes and to temporarily convert the direction of lanes to match the primary direction of travel (e.g., toward a city center for the morning commute and away from a city center for the evening commute). These approaches help only in the short term, as travelers adjust to increased capacity and populations in major metropolitan market areas continue to grow. In addition, the cost of housing in urban areas can push people to the suburbs and the exurbs, further increasing pressure on the transportation network and causing more traffic congestion.

Attempts to manage the demand side (i.e., users of roadway capacity) have largely been limited to traffic data reporting technologies (e.g., notifications of roadway congestion), which can also provide commuters with information on suggested routing. Such traffic data reporting technologies can use real-time and/or historical traffic data to forecast commute durations. To a lesser extent, some jurisdictions have also attempted to influence demand by charging for the use of roadways during peak commuting times.

Current data collection-based or data reporting-based traffic services also detect and report problems when and as they occur. For example, in response to a user query, such systems may report that a user is approaching or is now in a traffic jam, and may suggest an alternate route. While such data and information content can help individual commuters plan a route, having this information has not had a material impact on reducing overall traffic congestion.

SUMMARY

According to one example implementation, this specification describes a commuter demand control system that determines journey departure times and routes, using customized profiles that are based upon individual commuter inputs describing commuter travel constraints, travel flexibility, and commute preferences. In addition, when employers participate in this system, such inputs can be provided by employers on behalf of individual commuters.

While some current systems collect departure point, destination point, and departure time, they do not collect, process or store individual commuter inputs regarding their commute flexibility, such as the ability to work from home, flexible arrival/departure work hours when at the office, and other preferences. When understood, such flexibility variables, which are now in widespread use across both major and lesser-sized employers, are critically important to addressing roadway congestion as they can be used to spread demand across the limited roadway capacity. By centrally collecting and processing these variables, and using them to determine commuter schedules holistically, the commuter demand control system of this specification can coordinate commuter demand, spreading it across our limited roadway capacity resources.

In addition, the commuter demand control system may provide for several important technical advantages. For instance, by collecting commute profile data from multiple commuters, and determining commuting routes in batch (as opposed to computing routes individually, upon request from a commuter), the commuting routes can be determined more efficiently, i.e., using fewer CPU cycles. In addition, once computed, the commuting routes can be used to automatically activate traffic control devices (e.g., gates to High Occupancy Vehicle (HOV) lanes) and to guide the operation of autonomous vehicles.

Additional benefits may arise. For example, the system can reduce infrastructure investments for road improvement projects, as legacy infrastructure utilization is optimized. In addition, wear and tear on vehicles can be reduced as the system produces commute routes that result in shorter commute times, reduced fuel consumption, and a decreased need for braking.

One aspect features a commuter demand control system that can obtain commuter profiles, and each profile can identify a commuter, an origin, a destination and one or more commute preferences. The commuter demand control system can determine from the commuter profiles batches of commuter profiles. The commuter demand control system can determine, for a batch of commuter profiles, commute profiles, and each commute profile can correspond to a commuter profile in the batch of commuter profiles. The commuter demand control system can provide the commute profiles.

One or more of the following features can be included. The commuter demand control system can determine a utility function that produces a score, and the score can depend on at least one preference in at least one commuter profile in the batch of commuter profile. The commute profiles can optimize the score. The commuter demand control system can determine the commute profiles using linear programming. The commuter demand control system can determine the commute profiles using a machine learning model. The commuter demand control system can produce, using a commuter profile associated with a commuter, a first commute profile for the commuter and a second commute profile for the commuter, and when producing the second commute profile, the commuter demand control system can increase an input to the utility function in response to failing to satisfy a preference included in the commuter profile in the first commute profile. The commute profile can be provided to an autonomous vehicle.

A second aspect features a traffic control system that can obtain a commute profile for at least one commuter, and the commute profile can identify a commuter and an authorized time range. The authorized time range can indicate the period of time during which the commuter is authorized to traverse a traffic control device. The traffic control system can obtain commuter information, where the commuter information can identify a commuter that is in the vicinity of the traffic control device at a time point. In response to determining that the commuter is authorized to traverse the traffic control device at the time point, the traffic control system can actuate the traffic control device.

One or more of the following features can be included. The commute profile can be produced by a commuter demand control system. The traffic control device can be a retractable barrier or a tolling system.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
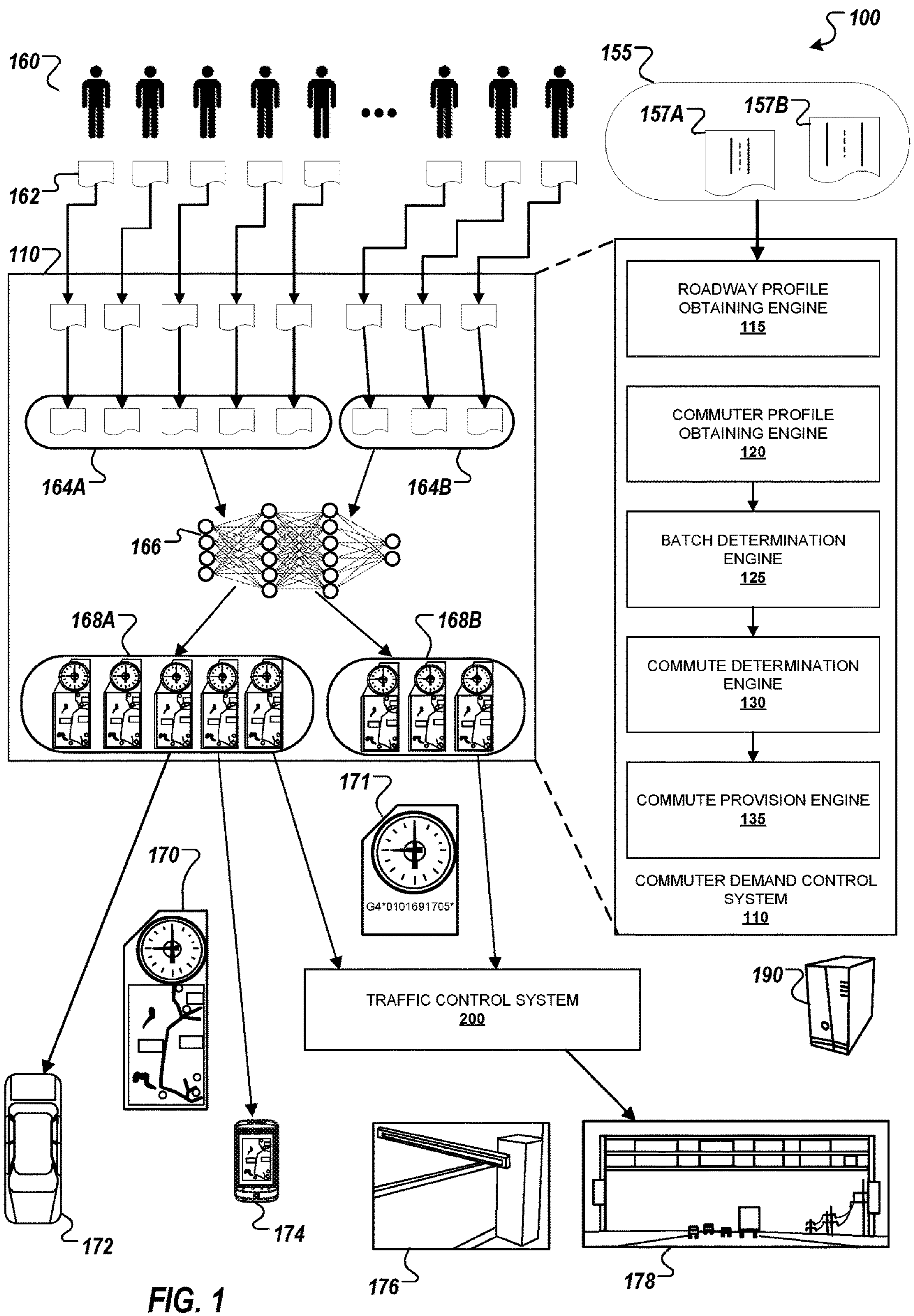
FIG. 1 is a diagram of an example system for transportation control.

FIG. 1 is a diagram of an example system 100 for transportation control. Briefly, the example system 100 includes a commuter demand control system 110 and a traffic control system 200, such as the example traffic control system that is described in FIG. 2. Note that while the ensuing discussion largely focuses on commuters and commuting, the techniques described in this specification can be applied to all sharing of limited roadway capacity as travelers move from one point to another.

In outline, this specification describes enhanced techniques for transportation control. In one example implementation, to direct commuters to the most efficient departure times and routes for their intended journey, a commuter demand control system uses linear programming applied to sets of aggregated commuter profile data, collected for a group of individual commuters, to coordinate each commuter's schedule and routing with others sharing the same transportation network. By analyzing the transportation network in light of the profile data, the techniques provide commuters the most efficient times and routes for their intended journey, and traffic throughput is optimized, materially reducing traffic congestion.

The commuter demand control system can obtain commuter profile data from each commuter by gathering inputs that identify a commuter, a journey origin, a journey destination, and one or more commuter preferences, which can include one or more "flexibility variables." Flexibility variables can include information related to a commuter's flexibility to work from home (WFH) during the week. WFH variables can specify the number of WFH days permitted over a given period (e.g., a week or a month), whether WFH days are restricted to specific weekdays (e.g., Tuesdays and Thursdays), whether the commuter can select their own WFH days, days that a commuter must work at their office (WFO), and so on. Flexibility variables can also include ranges of office arrival and departure times deemed acceptable to the commuter and/or employer. For example, an acceptable arrival time range may be 8:00 AM to 11:00 AM and an acceptable departure time range may be 2:30 PM to 6:30 PM.

Using the profile data and other inputs, the commuter demand control system can produce commuting schedules at various frequencies (e.g., daily, weekly, monthly, etc.) for one or more commuters. Each commuting schedule can be coordinated with other commuting profiles that share the same roadway network. The commute schedules can satisfy commute constraints, such as producing short-duration commutes, while adhering to the commuting constraints and flexibility guidelines provided in each profile. A commuting schedule can include a recommended departure time, estimated arrival time, and specific routing instructions, such as turn-by-turn directions.

When determining commuting schedules, the commuter demand control system attempts to optimize, according to constraints that can include those listed above, the overall traffic throughput—that is, the system attempts to minimize overall travel time, for example, by maximizing the number of vehicles that use roadway system over a given period. However, exceeding the capacity of roadway can lead to congestion, and therefore, in some circumstances, routing a smaller number of vehicles on a given roadway can increase throughput and routing a larger number of vehicles on a given roadway can decrease throughput.

A departure time is a key element of a commuting schedule and can be determined by the commuter demand control system. Departure times can be expressed as time ranges, such as 8:45 AM-9:00 AM. The time range increment (15 minutes in this example) can vary based on departure and arrival points, the overall demand on a given roadway, and the available roadway capacity, among other factors. In many cases, even for the highest-demand routing, a minimum time range increment (e.g., 15 minutes or 30 minutes) for departure can be used to ensure sufficient traveler flexibility.

The commuter demand control system of this specification can be considered a "control tower" that obtains and stores the commuter profiles for commuters, which can number in the tens or hundreds of thousands, as well as roadway capacity information. Such a control tower can obtain commuter profiles and use the profiles to compute, e.g., using linear programming (as described below), commuting schedules. The control tower can further provide the commuting schedules to the commuters.

The commuter demand control system can either operate on the individual commuter profiles described above, processing each profile individually, or it can "batch" commuter profiles with common characteristics that may facilitate processing, avoid concerns regarding privacy and enhance the system's overall performance.

In contrast to the commuter demand control system of this specification, in many current transportation control systems, users request routing information, often in real-time, and in response, the system computes and delivers a suggested route to the user. Such systems have numerous drawbacks. Importantly, this type of system lacks any coordination among its users, and will provide the same or similar routing information to all users in the same geographic region. Additionally, with current systems failing to consider the interaction among commuters, once commuters are on their designated route and are confronted with an impending traffic jam, users can be routed around one traffic jam, only to enter a new traffic jam created by the influx of cars routed by a conventional system onto a secondary route ill-suited to handle the increased traffic. Such suboptimal routing can cause its own traffic congestion with unwelcome intrusions into neighborhoods that are not designed for these traffic loads from a capacity standpoint, nor from one of public safety. In addition, since each route must be determined individually and on demand, excess computing resources are necessary as similar routes are recomputed.

Further, since existing routing systems lack coordinated behavior, routing vehicles in similar locations to similar routes, they fail to optimize travel time for all participating commuters, further wasting physical resources such as gasoline or battery charge, and creating undue wear on roadways. For example, a segment of roadway might have a capacity of one hundred vehicles per time period, and the first one hundred vehicle will pass with minimal delay. However, as conventional routing system increase the number of vehicles directed to a roadway, and that number exceeds the roadway capacity, all vehicles on the roadway segment can begin to experience delays. If navigation decisions were instead coordinated, and the results directed vehicles in excess of that roadway's capacity to use an alternate commute time, either earlier or a later, for that same roadway, or to use an alternate route, the average travel time for all vehicles can be reduced as compared to all vehicles attempting to use the primary route at the same time.

In addition, some travelers might have constraints that permit flexibility in their WFH or WFO travel times. For example, a commuter might be able to work from home one or more days per week, and/or have flexibility to arrive between 8 am and 10 am. Since these current example travel systems do not evaluate preferences and constraints, they have less ability to produce commute schedules that are beneficial to all travelers, while also reducing resource consumption.

Improving on these current example transportation technology and information reporting systems, the commuter demand control system described by this specification can consider constraints, preferences, road capacity and current road conditions to produce a commute profile that directs commuters or autonomous vehicles to use routes and times that optimize time and resource consumption.

In addition, using a commute profile, the transportation control system can control traffic control devices, further improving traffic flow. For example, in exchange for following a travel schedule that optimizes overall traffic flow, the system can actuate traffic control devices, such as traffic gates, allowing authorized vehicles to access restricted roadways such as HOV lanes. In addition, the traffic control system can direct tolling system to determine preferable tolling rates for vehicles that conform to schedules produced by the traffic control system.

Returning to FIG. 1, a commuter demand control system 110 can provide routing information to vehicles and to operators of vehicles. A commuter demand control system 110 can include a roadway profile obtaining engine 115, a commuter profile obtaining engine 120, a batch determination engine 125, a commute determination engine 130 and a commute provision engine 135.

The roadway profile obtaining engine 115 can obtain descriptors 157A, 157B of roadways. The roadway profile obtaining engine 115 can obtain the information from a roadway descriptor database, for example, by using structured query language (SQL) calls to retrieve the information from a database.

A roadway descriptor 157A, 157B can include a description of a roadway, or of a segment of a roadway, the capacity of the roadway, the current use of the roadway, and so on. The roadway, or segment of the roadway, can be described using the name of the roadway, start and end coordinates, and coordinates for waypoints within the roadway. The capacity of the roadway can be described as a vehicle capacity, such as 100 vehicles in the segment at a given time. The current use of the roadway can include the current number of vehicles on the roadway, their minimum, maximum and average speed, and other information relevant to roadway use. A roadway description 157A, 157B can be encoded as structured text, for example, as Extensible Markup Language (XML). For example, a roadway descriptor can have the form shown in Table 1, below.

TABLE 1

```
<Roadway>
  <Name> Route 66 </Name>
  <MaxCapacity> 100 </MaxCapacity>
  <CurrentUse> 80 </CurrentUse>
  <MaxSpeed> 45 </MaxSpeed>
  ...
</Roadway>
```

In some implementations, multiple roadway descriptors 157A, 157B can exist for the same roadway. In one example, a roadway descriptor includes in indication of the road condition, e.g., as an element in an XML representation of a roadway, and multiple roadway descriptors reflect differing driving conditions. One descriptor might indicate that it is relevant to night driving in clear conditions, another to day driving in snow, another to night driving in rain, and so on. For example, the roadway descriptor might take the form show in Table 2, below.

TABLE 2

```
<Roadway>
  <Name> Route 66 </Name>
  <MaxCapacity> 100 </MaxCapacity>
  <CurrentUse> 80 </CurrentUse>
  <Conditions>
    <Condition> Night </Condition>
    <Condition> Clear </Condition>
  </Conditions>
  ...
</Roadway>
```

In such implementations, the commuter demand control system can obtain weather information from conventional weather data sources, such as the National Weather Service. The commuter demand control system can obtain the information using any suitable information retrieval protocol such as the Transmission Control Protocol/Internet Protocol (TCP/IP), Hypertext Transfer Protocol (HTTP) or Hypertext Transfer Protocol Secure (HTTPS).

The commuter profile obtaining engine 120 can obtain profiles 162 that contain about commuters and their behaviors. For example, a profile can include an identifier of the commuter, and a list of days that a commuter works, and which of those days require travel to the office. The profile can include a home address, a primary work location and alternate work locations. The profile can include hours the range of hours during which a commuter prefers to work, and the range of hours in which a commuter is required to be available for meetings, which constrains the times that a commuter can be driving. The profile can include a preferred driving route, or traits of a preferred driving route, e.g., avoiding tolls or highways. The profile can include additional fields relevant to the commuter, the commuter's preferences, and commute requirements. Such a profile can be encoded as XML, for example, of a form shown in Table 3, below.

TABLE 3

```
<CommuterProfile>
  <CommuterID> 1234 </CommuterID>
  <CommuterName> Jane Doe </CommuterName>
  <HomeAddress> 999 Main Street, AnyTown, NC, 27000
  </HomeAddress>
  <WorkAddress>
    <PrimaryWork> 111 Elm Street, AnyTown, NC 27000
    </PrimaryWork>
    <SecondaryWork> NA </SecondaryWork>
  </WorkAddress>
  <PreferredWorkArrival> 8:30 </PreferredWorkArrival>
  <RequiredWorkArrival> 10:00 </RequiredWorkArrival>
  <PreferredWorkDeparture> 17:30 </PreferredWorkDeparture>
  ...
</CommuterProfile>
```

In some implementations, a commuter 160 can provide a profile or provide information the system can use to create a profile. For example, the system 110 can provide an application programming interface (API) through which a commuter 160 can supply information relevant to the commute. In some implementations, a proxy for a commuter 160 can supply some or all of the profile information. For example, an employer might provide required work hours and work locations.

In some implementations, the system can determine one or more fields present in a commuter's profile, as described further below. In some implementations, the system can combine provided and determined fields for a profile.

The batch determination engine 125 can accept the profiles 162 obtained by the commuter profile obtaining engine 120 and create batches 164A, 164B of profiles. A batch of profiles 164A, 164B can include a single profile 162, but typically contains multiple profiles as processing multiple profiles in a batch reduces the computational requirements of the system, and thus provides a technical benefit.

A batch of commuter profiles can be expressed as structured text, for example, as XML such as shown in Table 4, below.

TABLE 4

```
<CommuterBatch>
  <CommuterProfile> ... </CommuterProfile>
  ...
  <CommuterProfile> ... </CommuterProfile>
</CommuterBatch>
```

The <CommuterProfile> element can be the element described above.

The commute determination engine 130 can accept batches of profiles 164A, 164B and use profiles 162 in the batches to determine commute profiles 170, 171, where a commute profile includes elements describing a commute. Commute profiles 170, 171 can include an indication of the commuter, an origination point description, a destination description, travel instructions and a commute time window. The origination point description and the destination description can include a name for the location, such as "home" or "main office," and a geographic location indicator, such as coordinates expressed as latitude and longitude. In some implementations, an abbreviated form of a commute profile 171 can include only a subset of the information, for example, only the commuter identifier and an expected time the commuter will arrive at one or more waypoints, as described further below.

A commute profile can be expressed in XML, for example, of the form shown in Table 5, below.

TABLE 5

```
<CommuteProfile>
  <CommuterID> 1234 </CommuterID>
  <CommuterName> Jane Doe </CommuterName>
  <Origin> 999 Main Street, AnyTown, NC, 27000 </Origin>
  <Destination> 111 Elm Street, AnyTown, NC 27000 </Destination>
  <Departure> 8:10 </Departure>
  ...
  <TravelInstructions> ... < /TravelInstructions>
</CommuteProfile>
```

The travel instructions (e.g., the <TravelInstructions> element in the example above) can describe the prescribed route reserved for the commuter. The travel instructions can be expressed in any suitable format, such as turn-by-turn directions, lists of coordinates, and so on. An example is shown in Table 6, below.

TABLE 6

```
<TravelInstructions>
  <Origin> 999 Main Street, AnyTown, NC, 27000 </Origin>
  <TravelDirections>
    <Direction>
      <Street> North on Main Street </Street>
      <Length> 1.1 mile </Length>
      <Action> Left Turn </Action>
    </Direction>
    <Direction>
      <Street> West on Oak Street </Street>
      <Length> 1.5 mile </Length>
      <Action> Right Turn </Action>
    </Direction>
    ...
  </TravelDirections>
  ...
</TravelInstructions>
```

The commute time window can describe the time frame during which the commute's route has been reserved, and can take various forms. For example, the commute time window can specify a start time and an end time (e.g., 8 am to 8:30 am local time), a start time and a duration (e.g., 8 am local time and 30 minutes) or alternate specifications of the time window during which the commuter should begin travel. These times can be encoded as XML elements such as the elements shown in Table 7, below.

TABLE 7

```
<TimeWindow>
  <Begin> 8:00 </Begin>
  <Duration> 30 minutes </Duration>
</TimeWindow>
```

The commute determination engine 130 can provide commute profiles 170, 171 to a commute provisioning engine 135, which can supply the commute profiles to the various consumers of the profiles. For example, the system 110 can provide the commute profile 170 to a vehicle 172, such as an autonomous vehicle that can use the commute profile to guide its autonomous operation. In another example, the system 110 can provide the commute profile 170 to a user device 174, such as a mobile telephone associated with a commuter.

In some implementations, the system can provide commute profiles 171 to traffic control devices 176, 178. For example, the system 110 can provide commute profiles 171 to a control system for an automated traffic barrier 176, e.g., a physical gate or mobile barrier machinery, that permits the commuter to enter lanes of travel at a time described in the commute profile 171. In another example, the system 110 can provide commute profiles 171 to a control system for a tolling apparatus 176, and the commute profiles 171 can cause the tolling apparatus 176 to alter its operation. Such implementations are describe further in reference to traffic control systems of FIG. 2.

Figure 2:
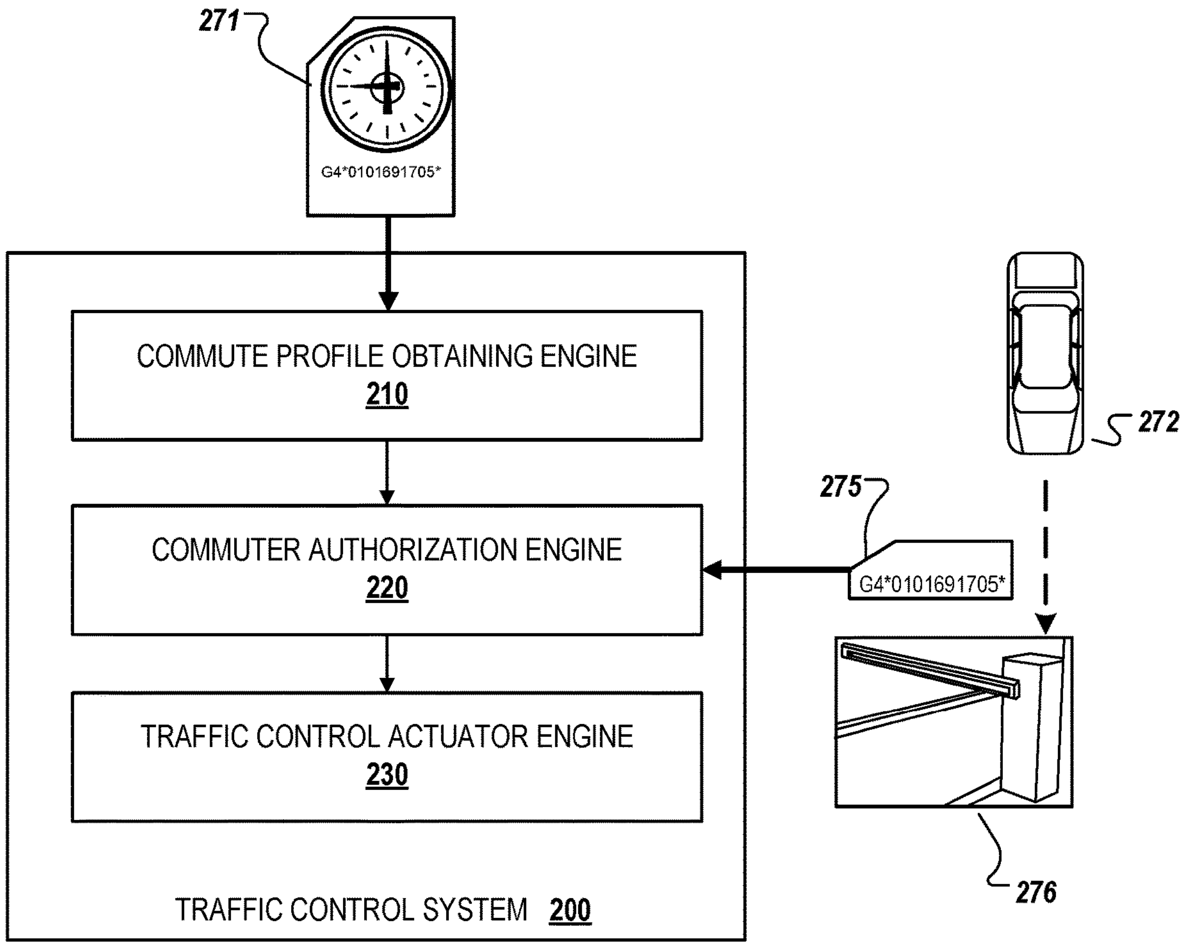
FIG. 2 is a diagram of an example system for traffic control.

FIG. 2 is a diagram of an example system 200 for traffic control. A traffic control system 200 can provide preferential traffic routes to authorized commuters, e.g., commuters following commute profiles provided by a commuter demand control system, by actuating traffic control devices, such as traffic-restricting gates and toll monitors. The system 200 can include a commute profile obtaining engine 210, a commuter authorization engine 220 and a traffic control actuator engine 230.

The commute profile obtaining engine 210 can obtain commute profiles 271, which can be, in some implementations, the commute profiles 171 of FIG. 1. As noted above, a commute profile can include an indicator of the commuter and travel information, which can indicate that a commuter will pass a traffic control device 276 controlled by the traffic control system 200. Commute profiles 271 can optionally include other information such as a description of the commuter's preferred vehicle, the commute origination and destination points, and so on.

The commute profile obtaining engine 210 can obtain commute profiles over any appropriate data transmission mechanism. For example, the commute profile obtaining engine 210 can obtain the information from a commuter demand control system connected by a network such as the Internet and using a networking protocol such as TCP/IP, HTTP or HTTPS.

In response to determining that a commuter 272 is approaching, for example, by reading a Radio Frequency Identifier (RFID) tag present on the commuter's vehicle, the commuter authorization engine 220 can accept a commuter identifier 275 and determine whether any commute profile 271 specifies that the commuter is authorized to traverse the traffic control apparatus 276 at or within a configured period around the time the commuter is approaching the traffic control apparatus.

Examples of a traffic control apparatus can include devices that permit and deny traffic entry into a road segment, devices that determine tolls, etc. Examples of devices that permit and deny entry can include gates that include moveable "arms" that block traffic when in a "down position" and permit traffic when in an "up" position. Devices that determine tolls can include the E-ZPass system maintained by the E-ZPass Interagency Group.

Upon determining that a commuter is authorized according to one or more instances of commute profiles, the traffic control actuator engine 230 can transmit a signal to a traffic control apparatus 276 indicating that the commuter is authorized to pass at the point in time. The signal can be an electrical or optical signal transmitted over a physical wire, or a signal sent over a wireless connection, such as Bluetooth or over a Wireless Fidelity (Wi-Fi) system, for example, as defined by the IEEE 802.11 protocol documentation.

Figure 3:
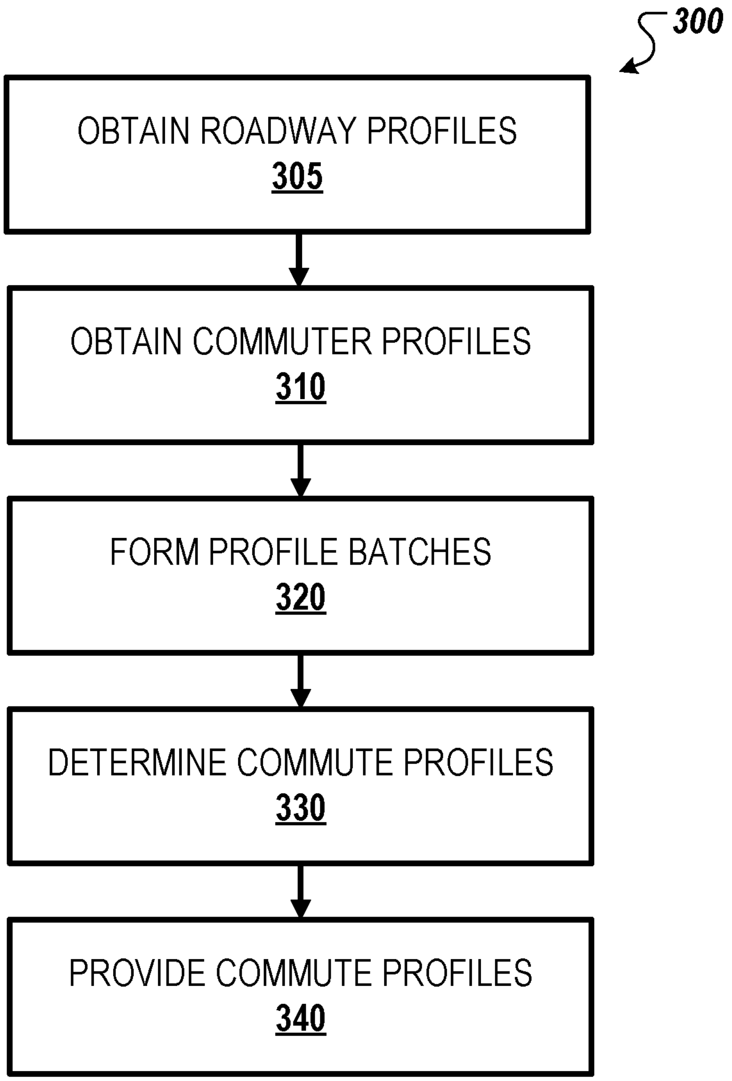
FIG. 3 is a flow diagram of an example process for commute control.

FIG. 3 is a flow diagram of an example process for commute control. For convenience, the process 300 will be described as being performed by a commuter demand control system of one or more computers located in one or more locations. For example, a system for commute control, e.g., the system for commute control 110 of FIG. 1, appropriately programmed in accordance with this specification, can perform the process 300.

The system obtains roadway profile information (305) using one or more data retrieval techniques. For example, the system can use SQL to retrieve roadway profile information from a relational database. In another example, the system can use HTTP or HTTPS to retrieve roadway profile information stored on a web server.

The system obtains commuter profiles (310) using one or more data retrieval techniques. For example, the system can use SQL to retrieve commuter profile information from a relational database. In another example, the system can use HTTP or HTTPS to retrieve commuter profile information stored on a web server.

In some implementations, the system can obtain fields of the commuter profile from multiple sources. For example, a commuter's home and work address can be obtained from a database containing location information and retrieved using SQL, and the commuter's preferred travel times can be received from a commuter who provides information over an API provided by the system. The API can be implemented, for example, as a web service deployed on a web server.

In some implementations, the system can accept data that is encoded in a non-standard form and can convert the data to the canonical format used by the system. For example, some data sources might include a single field for a name encoded as "FirstName LastName;" some data sources might include a single field for name encoded as "LastName, FirstName;" some data sources might have separate fields for first name and last name; some data sources might have one field for first name and middle initial and a second field for last name; and so on. The system can store parsing rules specific to the data source, and apply the rules to convert the data from the data source's non-standard form into the canonical form used by the system. For example, in some implementations, a "CommuterName" element in included in the CommuterProfile, and the "CommuterName" element is of the form "FirstName LastName." If a data source maintains name data in the form "LastName, FirstName," the rule can specify that the system should parse anything before the middle "," to the last name and everything after the comma to be the first name. To form the CommuterName field, the system can concatenate the parsed first name and the parsed last name, inserting a space in between.

More generally, a parsing rule can specify, for each element used by the system (e.g., "CommuterName"), a mapping from each possible source field to the element. A parsing rule can include regular expressions to parse the source field. In the example given above, the regular express can be "*,*", where the first "*" matches all characters before the comma and becomes the LastName in CommuterName, the "," matches the comma separator, and the second "*" matches all characters after the comma and becomes the FirstName in CommuterName.

In some implementations, the system can determine one or more fields present in a commuter's profile. For example, in some implementations, if a commuter's profile indicates the commuter's employer, the system can determine the required arrival time from information configured into the system by the employer. In some implementations, the system can retrieve information relevant to a commuter's profile by retrieving the information from an employee database using SQL.

In some implementations, the system accepts data that is incomplete. In some such examples, the system can determine values for fields in a commuter's profile by analyzing the commuter's actions. For example, if the commuter has a pattern of checking traffic at or around a certain time in the morning for travel between two locations, the system can determine that the commuter likely prefers to travel between those locations at or around that time. A pattern can be defined as a certain number of instances over a given time. For example, if the commuter checks the route twice a week for three weeks in a five-week span, the system can determine that a pattern exists. Other techniques for pattern detection can also be used.

In addition, in some examples, the system, upon detecting incomplete data, can retrieve data from alternate sources. The system can maintain a table that contains potential sources for each field, and can attempt to retrieve data from the source(s) when incomplete data is detected. For example, for a home address, the table can contain a link to an address directory, and upon determining that the home address is missing, the system can attempt to retrieve the data from the data source. For example, if the address directory is a relational database, the system can use SQL to retrieve the home address.

The system forms profile batches (320). The system can use various techniques for determining which profiles are combined into a batch. For example, the system can gather commuter profiles that arrive within a configured period (e.g., within 10 minutes) and include them in a batch. The system can gather commuter profiles until a configured number of profiles have arrived. The system can determine when the next commuter profile is due to be delivered, and gather commuter profiles until some configured period before the due time, where the configured period reflects the time necessary to compute the commute profiles and to provide them. The due time can be determined, for example, from the earliest time the next commuter will be scheduled to leave or when a commuter enters a vehicle. In some implementations, the system can form batches based on departure or arrival locations. For example, profiles for commuters who leave from or arrive at the same geographic zone can be included in the same batch. A geographic zone can include, for example, as a city block, a group of city blocks, a neighborhood, a region bounded by certain streets, and so on. In some implementations, the system can form batches based on required or desired departure and arrival time and flexibility variables, including WFH and WFO days and/or hours.

The system determines commute profiles (330) using the roadway profile information, the commute profiles in the batch and commute profiles previously provided to commuters due to commute during the specified time frame. As noted above, the commuter profile can include preferences and constraints related to each commuter's commute, and the roadway profile information can include information describing the capacity of a roadway or road segment, optionally under current or predicted weather conditions.

The system can define a utility function for each commuter, where the utility function considers as input the information in the commuter profiles, information in the roadway profiles and prior commute profiles that overlap the period for which the system is computing commute profiles. The utility function can be a linear combination of variables with the heaviest weight assigned to commute requirements, lower weights to the total travel time across all commuters, and the lowest weight to commuter preferences. The system can then maximize the total utility across all commuters, for example, by using linear programming.

In some implementations, the system can apply one or more adjustment factors to the utility function. For example, when a commuter's preferences for a commute are not satisfied, the system can add an adjustment factor by increasing the component of the utility function for that commuter's preferences. Similarly, when a commuter's preferences for a commute are satisfied, the system can decrease the component of utility function for that commuter's preferences. The result of such increases and decreases is to inject fairness: since the utility increases when a preference is not met, commuters whose preferences are not met for one commute are more likely to have them followed in a subsequent commute.

The process of determining schedules can be explained by way of example. For clarity, the example is simplified, including only a single primary roadway, a single secondary roadway, and a small number of profiles. In addition, various data elements that can be present in the system are omitted.

In this example, there are two roads, A and B, which connect a source (Main Street) to a destination (Elm Street). Road A is generally preferred since it is a high speed road with no traffic signals and results in a shorter commute time. Road B is a surface road with lower speed limits and traffic signals, and results in a longer commute time. The information can be encoded as shown in Table 8, below.

TABLE 8

```
<Roadway>
  <Name> A </Name>
  <MaxCapacity> 100 </MaxCapacity>
  <CurrentUse> 98 </CurrentUse>
  <MaxSpeed> 55 </MaxSpeed>
  ...
</Roadway>
<Roadway>
  <Name> B </Name>
  <MaxCapacity> 20 </MaxCapacity>
  <CurrentUse> 10 </CurrentUse>
  <MaxSpeed> 35 </MaxSpeed>
  ...
</Roadway>
```

Also in this example, the system has batched four commute profiles for the morning commutes of four commuters. (Recall this example is overly simplified for clarity; in practice, the system might consider many thousands of profiles traversing a road.) The commuters all work at the same destination, prefer the same arrival time and live in close proximity on Main Street. Such commuter profiles can be expressed as shown in Tables 9-12, below.

TABLE 9

```
<CommuterProfile>
  <CommuterID> 1 </CommuterID>
  <HomeAddress> 1 Main Street, AnyTown, NC, 27000
  </HomeAddress>
  <WorkAddress>
    <PrimaryWork> 1 Elm Street, AnyTown, NC 27000
    </PrimaryWork>
  </WorkAddress>
  <PreferredWorkArrival> 8:30 </PreferredWorkArrival>
```

TABLE 9-continued

```
        <RequiredWorkArrival> 10:00 </RequiredWorkArrival>
        ...
    </CommuterProfile>
```

TABLE 10

```
<CommuterProfile>
  <CommuterID> 2 </CommuterID>
  <HomeAddress> 2 Main Street, AnyTown, NC, 27000
  </HomeAddress>
  <WorkAddress>
    <PrimaryWork> 1 Elm Street, AnyTown, NC 27000
    </PrimaryWork>
  </WorkAddress>
  <PreferredWorkArrival> 8:30 </PreferredWorkArrival>
  <RequiredWorkArrival> 10:00 </RequiredWorkArrival>
  ...
</CommuterProfile>
```

TABLE 11

```
<CommuterProfile>
  <CommuterID> 3 </CommuterID>
  <HomeAddress> 3 Main Street, AnyTown, NC, 27000
  </HomeAddress>
  <WorkAddress>
    <PrimaryWork> 1 Elm Street, AnyTown, NC 27000
    </PrimaryWork>
  </WorkAddress>
  <PreferredWorkArrival> 8:30 </PreferredWorkArrival>
  <RequiredWorkArrival> 10:00 </RequiredWorkArrival>
  ...
</CommuterProfile>
```

TABLE 12

```
<CommuterProfile>
  <CommuterID> 4 </CommuterID>
  <HomeAddress> 4 Main Street, AnyTown, NC, 27000
  </HomeAddress>
  <WorkAddress>
    <PrimaryWork> 1 Elm Street, AnyTown, NC 27000
    </PrimaryWork>
  </WorkAddress>
  <PreferredWorkArrival> 8:30 </PreferredWorkArrival>
  <RequiredWorkArrival> 10:00 </RequiredWorkArrival>
  ...
</CommuterProfile>
```

Further, for this example, the travel time from "1 Main Street, AnyTown, NC" to "1 Elm Street, AnyTown, NC 27000" is 10 minutes on Road A and 20 minutes on Road B, provided the capacity limits of the roads are not exceeded. However, if the capacity is exceeded, the travel time on Road A increases to 30 minutes and on Road B to 40 minutes.

The system will attempt to optimize a utility function in which the heaviest weight is assigned to commute requirements, lower weights to the total travel time across all commuters, and the lowest weight to commuter preferences. Such a function, which the system would attempt to minimize, can be expressed as show in Equation (1), below.

$$\Sigma^{Commuters} W_1(\mathrm{Max}((PA_i-RA_i),0)+W_2(\mathrm{TravelTime}_i)+W_3(\mathrm{Abs}((PA_i-PF_i),0) \quad (1)$$

This formula is a summation over all commuters of a weighted sum of the difference between a projected arrival (PA) and required arrival (RA), the travel time, and the difference between the projected arrival and the preferred arrival (PF), where $W_1$, $W_2$ and $W_3$ are the weights of the first, second and third terms, respectively. By applying a maximum ("Max") operator, the first term specifically measures cases where the projected arrival is after the required arrival, which as noted above, the system tries to minimize. The final term measure the difference between the projected arrival and the preferred arrival. By applying an absolute value operator, the system treats arrivals earlier and later than the preferred time equivalently. The weight terms specify the relative priority of the terms, and can be set, for example, to 20, 10 and 1, to reflect the relative priority of the terms. The results are shown in Equation (2), (2) below.

$$\Sigma^{Commuters} 20(\mathrm{Max}((PA_i-RA_i),0)+10(\mathrm{TravelTime}_i)+(\mathrm{Abs}((PA_i-PF_i),0) \quad (2)$$

Returning to the example, the system can place the first two commuters (1 and 2) on road A such that they arrive at their desired time (8:30). For these commuters, the first and last terms will both be zero as they meet both their required and preferred arrival times. Since road A will be within its capacity, the travel time for each commuter will be 10 minutes, so the middle term for each commuter will be 100, and the sum of these terms will be 200.

The system will next place the final two commuters (3 and 4) on road A, but have them depart 10 minutes after their desired time, allowing commuters 1 and 2 to clear the road, and ensuring sufficient capacity. For these commuters, the first term will be zero as the commuters meet their required arrival times. Since road A will be within its capacity, the travel time for each commuter will be 10 minutes, so the middle term for each commuter will be 100, and the sum of these terms will be 200. Since the commuters will arrive 10 minutes after their preferred time, the third term for both commuters will be 10, and since the weight is 1, the sum is twenty. Thus, the overall utility of these commutes is 200 (for the first two commuters)+220 (for the second two commuters), which is 420, the minimum possible value.

To illustrate why this is the minimum value, if the system assigned the commuters to the alternate road, but at their preferred time, the second term would increase to 200 for each commuter (20 minutes times the weight of 10), or 400 total. Thus the total utility increases from the optimal of 220 to 600.

Continuing the example, since commuters 3 and 4 did not received their preferred arrival time, the system can apply an adjustment factor, e.g., 5, to the weight term for those commuters. Thus, the equation for the first two commuters is shown in Equation (3), below.

$$\Sigma^{Commuters} 20(\mathrm{Max}((PA_i-RA_i),0)+10(\mathrm{TravelTime}_i)+(\mathrm{Abs}((PA_i-PF_i),0) \quad (3)$$

And the equation for the second two commuters is shown in Equation (4), below.

$$\Sigma^{Commuters} 20(\mathrm{Max}((PA_i-RA_i),0)+10(\mathrm{TravelTime}_i)+5(\mathrm{Abs}((PA_i-PF_i),0) \quad (4)$$

As is apparent, the system will determine by applying linear programming that the minimum value can be attained simply by swapping the commute schedules—that is, assigning commuters 1 and 2 to leave 10 minutes beyond their desired time, and assigning commuters 3 and 4 to leave at their desired time. The resulting utility is again 420.

In some implementations, the system can use a machine learning model, such as a neural network or a residual neural network, to produce commute profiles. The model can be trained using training examples that each include the information in a commuter profile, information in the roadway profiles and prior commute profiles that overlap the period for which the system is computing commute profiles.

Each training example can include a score, where a higher score indicates a preferable commute profile and a lower score indicates a less preferable commute profile. In some implementations, a score of 1 can be assigned if the commute profile is acceptable and 0 otherwise. Once trained, the model can take as input a commuter profile and produce data for a commute profile including a start time, and end time and a route.

The system provides commute profiles (340). For example, the system can place the commute profiles on a server and provide the commute profiles in response to requests. For example, if the server is a web server, the system can provide commute profiles in response to requests received over HTTP. In another example, if the server is a database server, the system can provide commute profiles in response to SQL requests.

Figure 4:
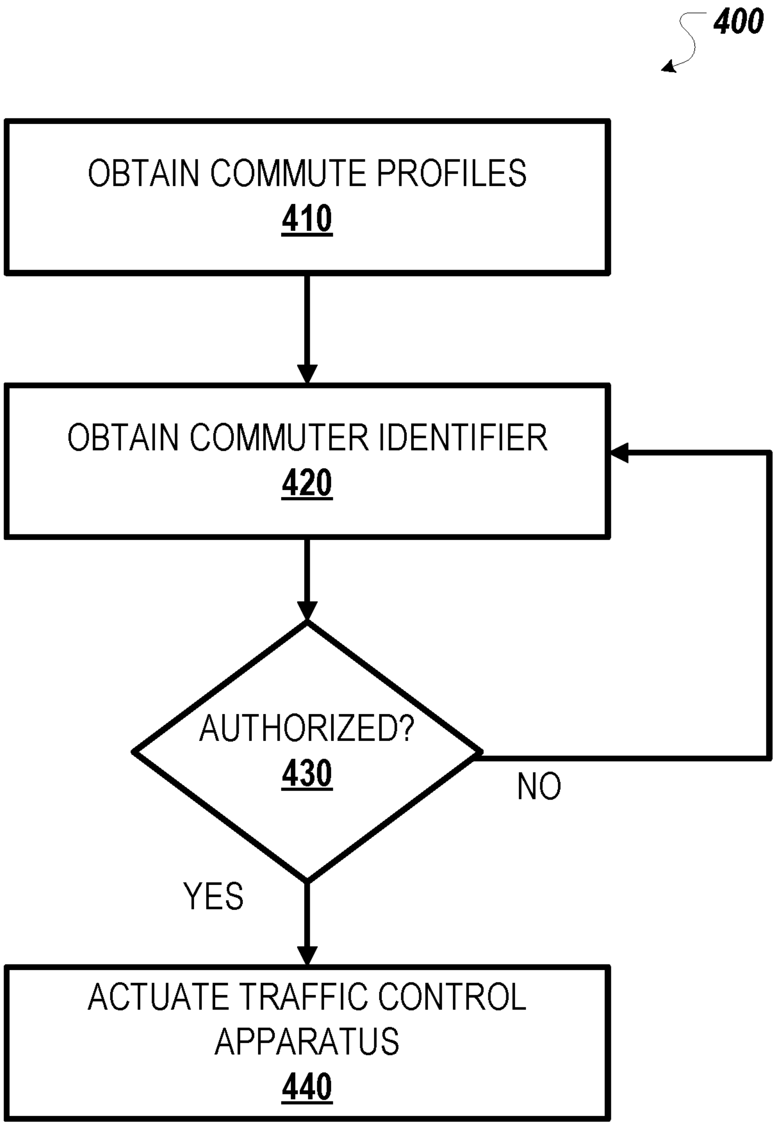
FIG. 4 is a flow diagram of an example process for traffic control.

FIG. 4 is a flow diagram of an example process for traffic control. For convenience, the process 400 will be described as being performed by a traffic control systems of one or more computers located in one or more locations. For example, a system for traffic control, e.g., the system for traffic control 200 of FIG. 2, appropriately programmed in accordance with this specification, can perform the process 400.

The system obtains commute profiles (410). The system can obtain profiles by retrieving them from a server using techniques appropriate for the server. For example, if the server is a web server, the system can obtain the commute profiles in by transmitting a request over HTTP and parsing the response. In another example, if the server is a database server, the system can obtain commute profiles by issuing SQL requests appropriate for the database schema.

Note that if the system for traffic control and the system for commute control are located on one or more servers that share memory or storage subsystems, the system can obtain commute profiles (410) by accessing the shared memory or storage subsystem, increasing the efficiency of the data transfer.

The system obtains a commuter identifier (420). The system can obtain a commuter identifier by reading a transmitter, such as an RFID transponder, coupled to the commuter's vehicle. An example of such a transmitter is an E-ZPass transponder. An identifier can be determined from an E-ZPass transponder by an E-ZPass reader.

The system determines whether a commuter is authorized (430). The system can make the determination, for example, by comparing a commuter identifier to identifiers in the commute profiles, and selecting commute profiles that contain matching identifiers. The system can determine that the commuter should be authorized if any such profile indicates that the commuter is authorized to pass the traffic control device 276 at the given time. If the commuter is authorized, the system can actuate traffic control apparatus (440). A commuter is deemed to be authorized if a commute profile for the commuter contains travel directions that traverse the traffic control apparatus during the period of travel. The period of travel can be defined as the begin time of the commute to a configured or determined duration after the begin time of the commute. The duration can be, for example, the expected length of the commute, the expected length of the commute plus an additional time period (e.g., 30 minutes), the determined expected length of the commute under current traffic conditions, and so on. If the commuter is not authorized, the system will not actuate the traffic control apparatus and can wait to obtain another commuter identifier (420).

If the commuter is authorized, the system can actuate a traffic control apparatus (440) using techniques specific to the traffic control apparatus. For example, to indicate that a gate should be opened, the system can send an electrical or wireless signal to the gate's control apparatus.

If the traffic control apparatus is a toll reader, the system can actuate the toll reader by sending a message indicating that the commuter is authorized. The system can send such a message, for example, by passing data across a wireless network that connects the system to the toll reader. In response, the toll reader can configure the tolling mechanism for an authorized commuter. For example, the authorized commuter might be charged no toll or a reduced toll.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database control system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method of controlling transportation, comprising:

obtaining, by a commuter demand control system, a plurality of commuter profiles wherein each profile in the plurality of commuter profiles identify a commuter, an origin, a destination and one or more commute preferences;

determining, by the commuter demand control system, batches of commuter profiles from the plurality of commuter profiles;

determining, by the commuter demand control system and for a batch of commuter profiles, a plurality of commute profiles, wherein each commute profile corresponds to a commuter profile in the batch of commuter profiles; and providing, by the commuter demand control system, the plurality of commute profiles.

2. The computer-implemented method of claim 1, where determining the commute profiles further comprises:

determining, by the commuter demand control system, a utility function that produces a score, wherein the score depends on at least one preference in at least one commuter profile in the batch of commuter profiles, wherein the plurality of commute profiles optimizes the score.

3. The computer-implement method of claim 1, wherein commuter demand control system determines the plurality of commute profiles using linear programming.

4. The computer-implement method of claim 1, wherein commuter demand control system determines the plurality of commute profiles using a machine learning model.

5. The computer-implemented method of claim 2, wherein the commuter demand control system produces, using a commuter profile associated with a commuter, a first commute profile for the commuter and a second commute profile for the commuter, and wherein when producing the second commute profile, the commuter demand control system increases an input to the utility function in response to failing to satisfy a preference included in the commuter profile in the first commute profile.

6. The computer-implemented method of claim 1, wherein a commute profile is provided to an autonomous vehicle.

7. A computer-implemented method of controlling transportation, comprising:

obtaining, by a traffic control system, a commute profile for at least one commuter, wherein the commute profile identifies a commuter and an authorized time range, wherein the authorized time range indicates the period of time during which the commuter is authorized to traverse a traffic control device;

obtaining, by the traffic control system, commuter information, wherein the commuter information identifies a commuter that is in the vicinity of the traffic control device at a time point; and in response to determining that the commuter is authorized to traverse the traffic control device at the time point, actuating, by the traffic control system, the traffic control device.

8. The computer-implemented method of claim 7, wherein the commute profile is produced by a commuter demand control system.

9. The computer-implemented method of claim 7, wherein the traffic control device is a retractable barrier.

10. The computer implemented method of claim 7, wherein the traffic control device is a tolling system.

11. A system comprising one or more computers and one or more storage devices storing instructions that when executed by the one or more computers cause the one or more computers to perform operations comprising:

obtaining, by a commuter demand control system, a plurality of commuter profiles wherein each profile in the plurality of commuter profiles identify a commuter, an origin, a destination and one or more commute preferences;

determining, by the commuter demand control system, batches of commuter profiles from the plurality of commuter profiles;

determining, by the commuter demand control system and for a batch of commuter profiles, a plurality of commute profiles, wherein each commute profile corresponds to a commuter profile in the batch of commuter profiles; and providing, by the commuter demand control system, the plurality of commute profiles.

12. The system of claim 11, where determining the commute profiles further comprises:

determining, by the commuter demand control system, a utility function that produces a score, wherein the score depends on at least one preference in at least one commuter profile in the batch of commuter profiles, wherein the plurality of commute profiles optimizes the score.

13. The system of claim 11, wherein commuter demand control system determines the plurality of commute profiles using linear programming.

14. The system of claim 11, wherein commuter demand control system determines the plurality of commute profiles using a machine learning model.

15. The system method of claim 12, wherein the commuter demand control system produces, using a commuter profile associated with a commuter, a first commute profile for the commuter and a second commute profile for the commuter, and wherein when producing the second commute profile, the commuter demand control system increases an input to the utility function in response to failing to satisfy a preference included in the commuter profile in the first commute profile.

16. The system of claim 11, wherein a commute profile is provided to an autonomous vehicle.

* * * * *